United States Patent
Karunamuni et al.

(10) Patent No.: US 10,051,104 B2
(45) Date of Patent: Aug. 14, 2018

(54) DELIVERY/READ RECEIPTS FOR ELECTRONIC MESSAGING

(75) Inventors: Chanaka G. Karunamuni, San Jose, CA (US); Richard R. Dellinger, San Jose, CA (US)

(73) Assignee: APPLE INC., Cupertino, CA (US)

( * ) Notice: Subject to any disclaimer, the term of this patent is extended or adjusted under 35 U.S.C. 154(b) by 1151 days.

(21) Appl. No.: 13/471,372

(22) Filed: May 14, 2012

(65) Prior Publication Data

US 2013/0305164 A1    Nov. 14, 2013

(51) Int. Cl.
| | | |
|---|---|---|
| *G06F 3/01* | (2006.01) | |
| *G06F 15/16* | (2006.01) | |
| *H04M 1/725* | (2006.01) | |
| *G06Q 10/10* | (2012.01) | |

(52) U.S. Cl.
CPC ...... *H04M 1/72547* (2013.01); *G06Q 10/107* (2013.01)

(58) Field of Classification Search
None
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,421,472 B1* | 9/2008 | Ross, Jr. ................. | G06F 15/16 709/206 |
| 7,663,607 B2 | 2/2010 | Hotelling et al. | |
| 8,116,739 B2 | 2/2012 | Klassen et al. | |
| 8,479,122 B2 | 7/2013 | Hotelling et al. | |
| 9,166,892 B1* | 10/2015 | Prado ..................... | H04L 51/16 |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Constine, Josh. "Facebook Messenger Apps Get More Life-Like, Now Show If Someone's Read your Message", May 4, 2012, http://techcrunch.com/2012/05/04/facebook-messenger-read-receipts/.*

(Continued)

*Primary Examiner* — Kieu Vu
*Assistant Examiner* — Alvaro R Calderon, IV
(74) *Attorney, Agent, or Firm* — Morrison & Foerster LLP (57) ABSTRACT

Systems, methods, and computer program products for delivery/read receipts for electronic messaging are disclosed. During one-on-one electronic messaging sessions in a conversation view format, only a single read receipt is shown only for the most recent message transmitted in the conversation. In some implementations, a delivery receipt is shown which then can be replaced or morphed into a read receipt. In a group conversation, a read receipt can be displayed for the recipient who most recently caught up in the ongoing conversation.

21 Claims, 8 Drawing Sheets

(56) References Cited

U.S. PATENT DOCUMENTS

| | | | |
|---|---|---|---|
| 2006/0112380 A1* | 5/2006 | Heller | G06F 17/30551 |
| | | | 717/168 |
| 2006/0197753 A1 | 9/2006 | Hotelling | |
| 2007/0143417 A1 | 6/2007 | Daigle | |
| 2008/0219416 A1* | 9/2008 | Roujinsky | G06Q 30/02 |
| | | | 379/88.13 |
| 2009/0089716 A1* | 4/2009 | Chen | G06F 3/011 |
| | | | 715/863 |
| 2009/0172399 A1* | 7/2009 | Schmid | G06Q 10/107 |
| | | | 713/168 |
| 2010/0087173 A1* | 4/2010 | Lin | H04L 51/16 |
| | | | 455/412.2 |
| 2010/0250682 A1* | 9/2010 | Goldberg | G06Q 10/107 |
| | | | 709/206 |
| 2010/0304766 A1 | 12/2010 | Goyal | |
| 2011/0126126 A1* | 5/2011 | Blair | G06Q 10/107 |
| | | | 715/752 |
| 2011/0231499 A1* | 9/2011 | Stovicek | H04M 1/72547 |
| | | | 709/206 |
| 2012/0036197 A1 | 2/2012 | Bishop | |
| 2012/0066615 A1* | 3/2012 | Brugler | G06Q 10/107 |
| | | | 715/752 |
| 2012/0179767 A1* | 7/2012 | Clarke | H04L 51/34 |
| | | | 709/206 |
| 2012/0210334 A1* | 8/2012 | Sutedja | G06Q 10/107 |
| | | | 719/314 |
| 2012/0231770 A1* | 9/2012 | Clarke | H04L 51/34 |
| | | | 455/414.1 |
| 2012/0290665 A1* | 11/2012 | Pickering | G06Q 10/107 |
| | | | 709/206 |
| 2013/0198296 A1* | 8/2013 | Roy | G06Q 10/107 |
| | | | 709/206 |
| 2013/0212202 A1* | 8/2013 | Lee | H04L 51/04 |
| | | | 709/206 |
| 2014/0096034 A1* | 4/2014 | Blair | G06Q 10/107 |
| | | | 715/752 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

DELIVERY/READ RECEIPTS FOR ELECTRONIC MESSAGING

TECHNICAL FIELD

This disclosure is related generally to electronic messaging.

BACKGROUND

A prominent feature of many conventional messaging applications is delivery and read receipts, which indicate to message senders when a message has been delivered or read by a message recipient. Some conventional electronic messaging applications indicate delivery and read status by one or more checkmarks displayed next to the message. For example, some applications display a single checkmark next to a message when it has been delivered and a second checkmark next to the message when it has been read. The display of numerous checkmarks next to each message in an electronic messaging session can quickly clutter the graphical user interface (GUI) for the messaging application.

SUMMARY

Systems, methods, and computer program products for delivery/read receipts for electronic messaging are disclosed. During a one-on-one electronic messaging session in a conversation view format, only a single read receipt is shown only for the most recently transmitted message in the conversation. In some implementations, a delivery receipt is shown which can then be replaced or morphed into a read receipt. In a group conversation, a read receipt can be displayed for the recipient who most recently caught up in the ongoing conversation.

Particular implementations of delivery/read receipts for electronic messaging disclosed herein provide one or more of the following advantages. By showing a single read receipt, screen clutter imposed by multiple read and delivery receipts can be reduced.

The details of the disclosed implementations are set forth in the accompanying drawings and the description below. Other features, objects, and advantages will be apparent from the description and drawings, and from the claims.

DESCRIPTION OF DRAWINGS

The same reference symbol used in various drawings indicates like elements.

DETAILED DESCRIPTION

This disclosure describes various Graphical User Interfaces (UIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers "to select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

Exemplary GUIs for Electronic Messaging with Delivery/Read Receipts

Figure 1:
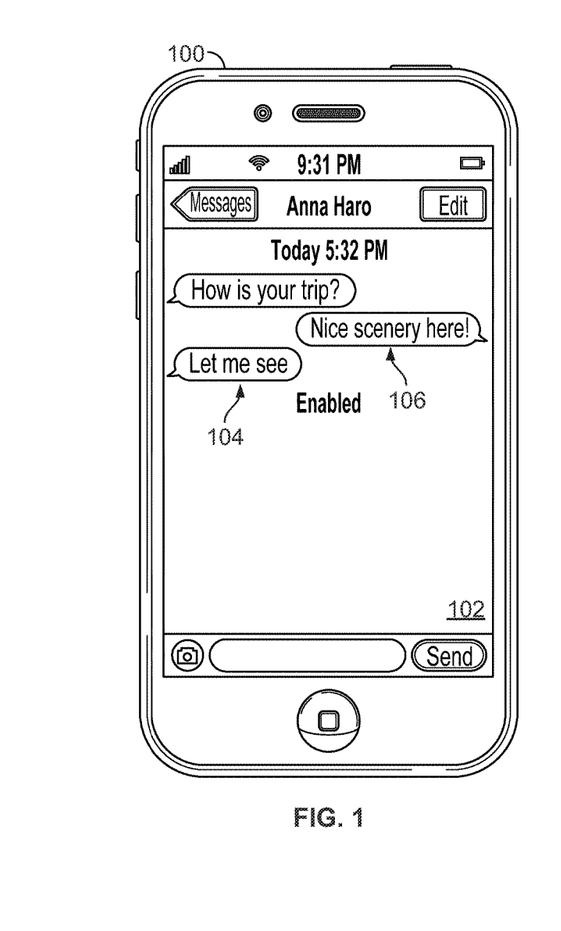
FIGS. 1-7 illustrate exemplary GUIs for electronic messaging using delivery/read receipts.
Figure 2:
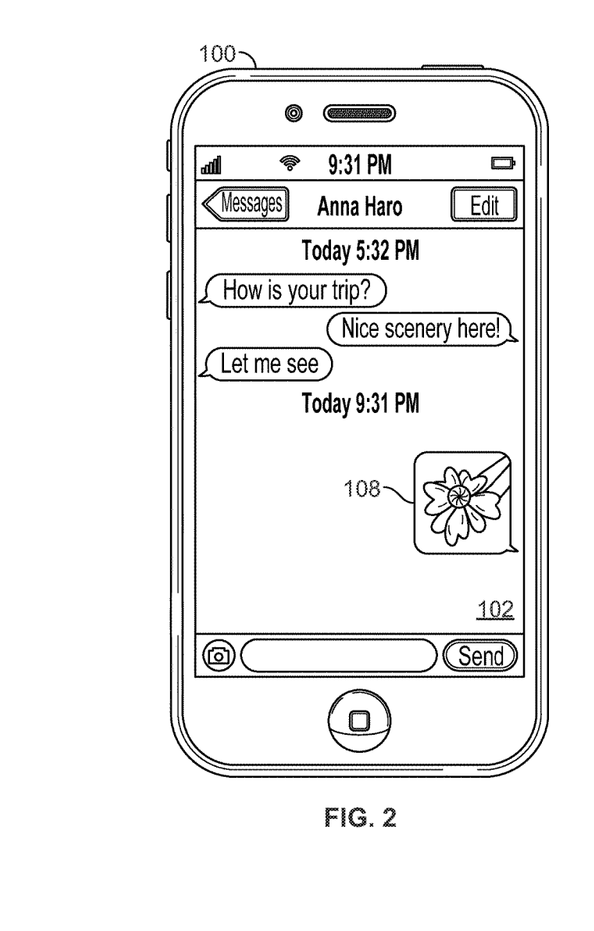
Figure 3:
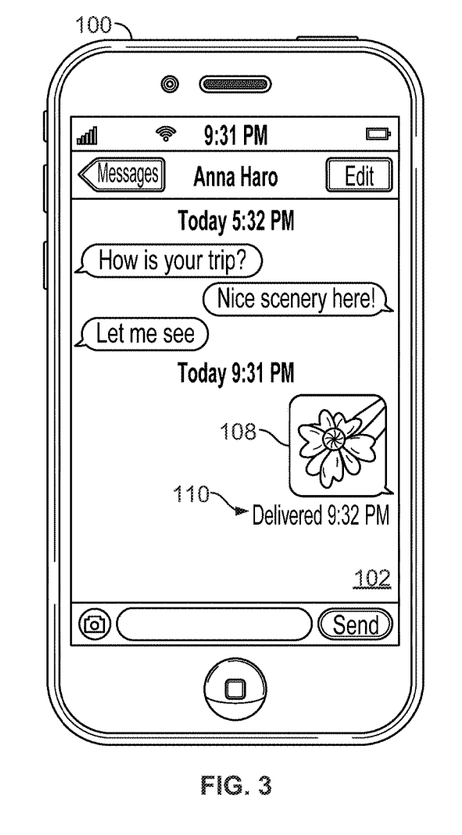

FIG. 1 illustrates an exemplary GUI 102 of an electronic device 100 for electronic messaging using delivery/read receipts. In the example shown, GUI 102 is presenting a conversation view for an electronic messaging session between two users. Received text messages or media items are displayed on the left-hand side 104 of GUI 102 and sent messages or media items are presented on the right-hand side 106 of GUI 102. In this example, device 100 is a smartphone operated by "Anna Haro." Anna we received a text message from a friend asking: "How is your trip?" Anna replied "Nice scenery here!" and sent her friend digital image 108, as shown in FIG. 2. When digital image 108 is received by the friend, delivery receipt 110 is presented on GUI 102 beneath digital image 108, as shown in FIG. 3. In some implementations, delivery receipt 110 can include the term "delivered" and the time of delivery. In this example, digital image 108 was sent at 9:31 PM and delivered at 9:32 PM.

Figure 4:
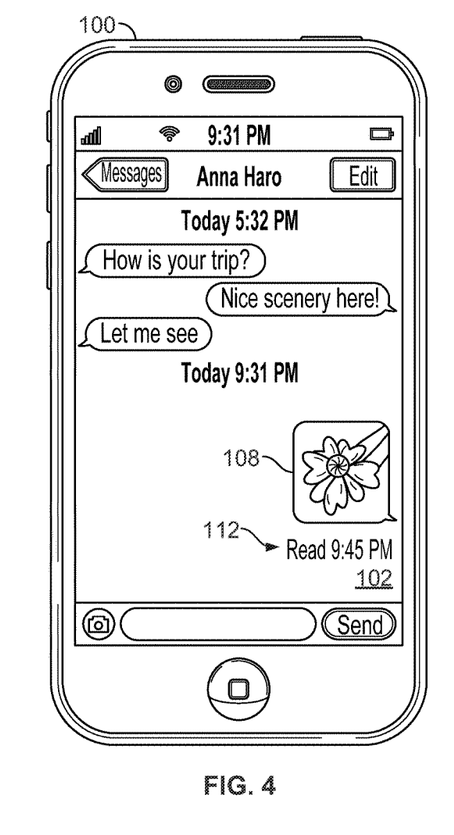

Referring to FIG. 4, read receipt 112 is presented on GUI 102 beneath digital image 108, indicating that the image file had been read. Thus, read receipt 112 replaced delivery receipt 110 only for the most recent message in the conversation. This replacement resulted in reduced clutter on GUI 102 as compared to conventional electronic messaging applications that use multiple checkmarks to indicate delivery and receipt of messages.

Figure 5:
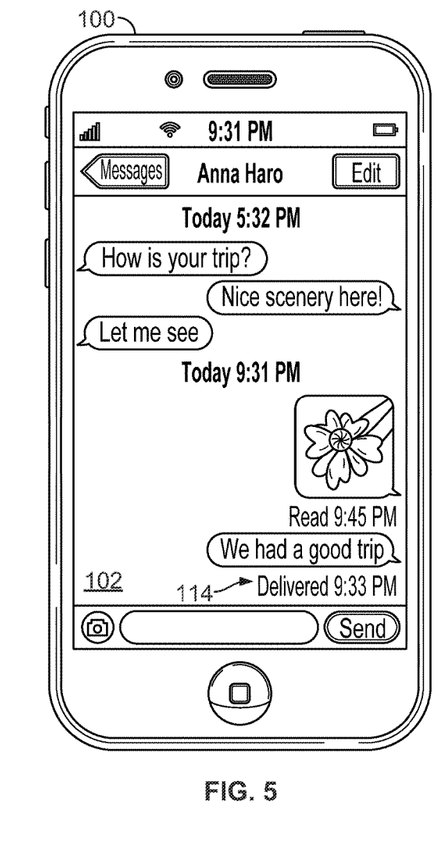
Figure 6:
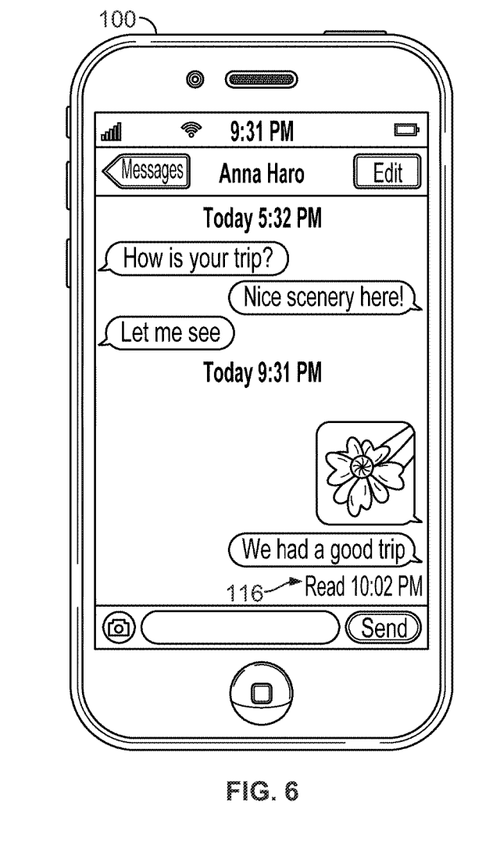

Referring to FIGS. 5 and 6, Ann types and sends the message: "We had a good trip." Delivery receipt 114 is displayed under the message on GUI 102 indicating that the message was delivered to a recipient device. When the message is read by the recipient, delivery receipt 114 is replaced with read receipt 116 only for the most recent message in the conversation. In this example, the message was delivered at 9:33 PM and read at 10:02 PM.

The example described above takes advantage of an inherent property of the conversation view format. If a first individual sends a second individual a first message and then updates the conversation with a second message, and the second individual reads the second or most recent message, the first individual will know that the second individual has also read the first message. This is the case because both the first and second individuals are seeing the same conversation view. Since in conversation view it is the entire conversation being updated and read, instead of the individual messages in the conversation, only a single read receipt is needed on the most recent message. If the first individual knows that the read receipt was received by the second individual, then the first individual knows that the second individual received the previous read receipts as well.

Thus, by showing only a single read receipt, one can significantly reduce clutter imposed by conventional read and delivery receipts. As shown in FIGS. 1-6, this technique can be further improved by showing a delivery receipt and replacing it with a read receipt. If a message was read, it must have been delivered successfully.

Figure 7:
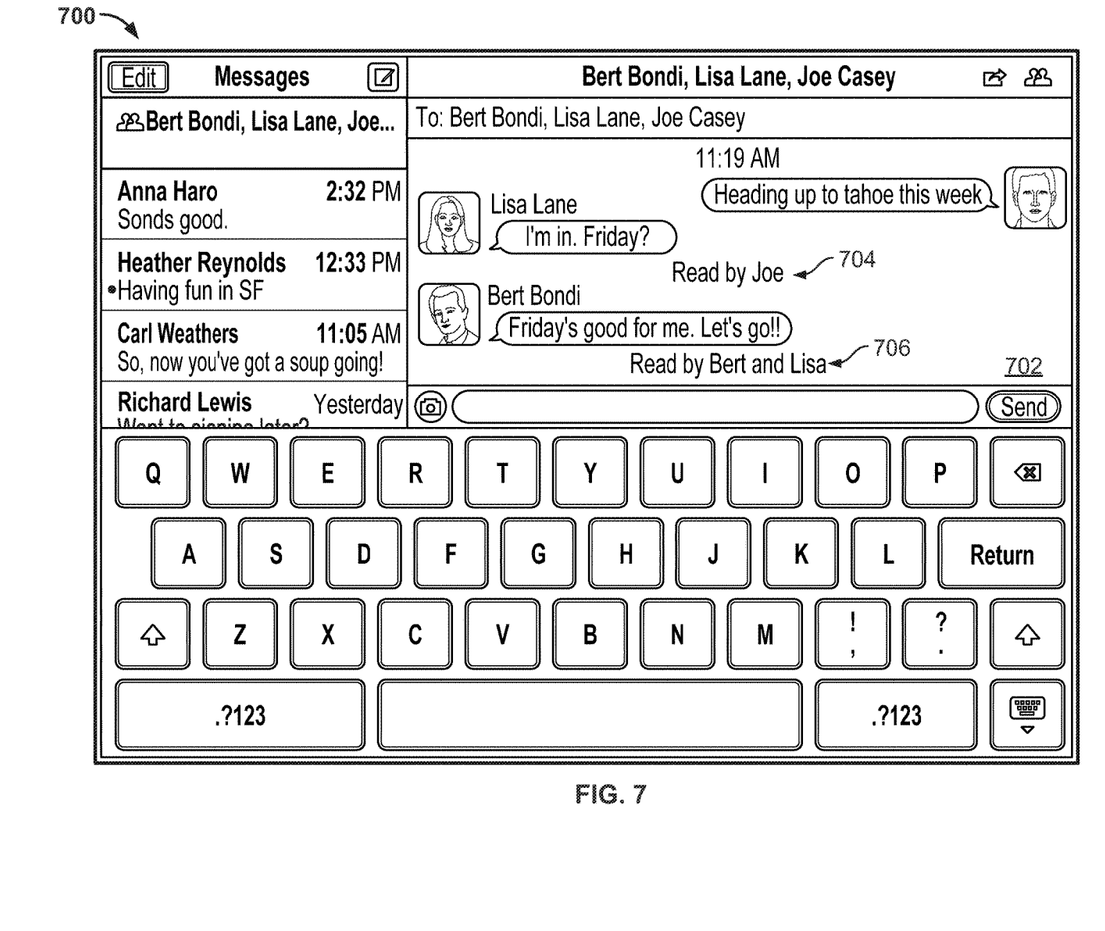

FIG. 7 illustrates an exemplary GUI 700 for an electronic messaging system with delivery/read receipts, where three or more individuals are communicating in a group conversation. In this example, Lisa, Bert and Joe are communicating on GUI 702 and their respective messages are displayed in conversation view 702. Joe starts the conversation with the text message: "Heading up to tahoe this week." Lisa responds with the text message: "I'm in. Friday?" Lisa's text message is followed by read receipt 704 indicating that Lisa's text message was read by Joe. Next Bert responds with the text message: "Friday's good for me. Let's go!!" Bert's text message is followed by read receipt 706 indicating that the message was read by both Bert and Lisa. Thus, the example described above provides read receipts only for the most recent individuals who have caught up in the conversation.

Figure 8:
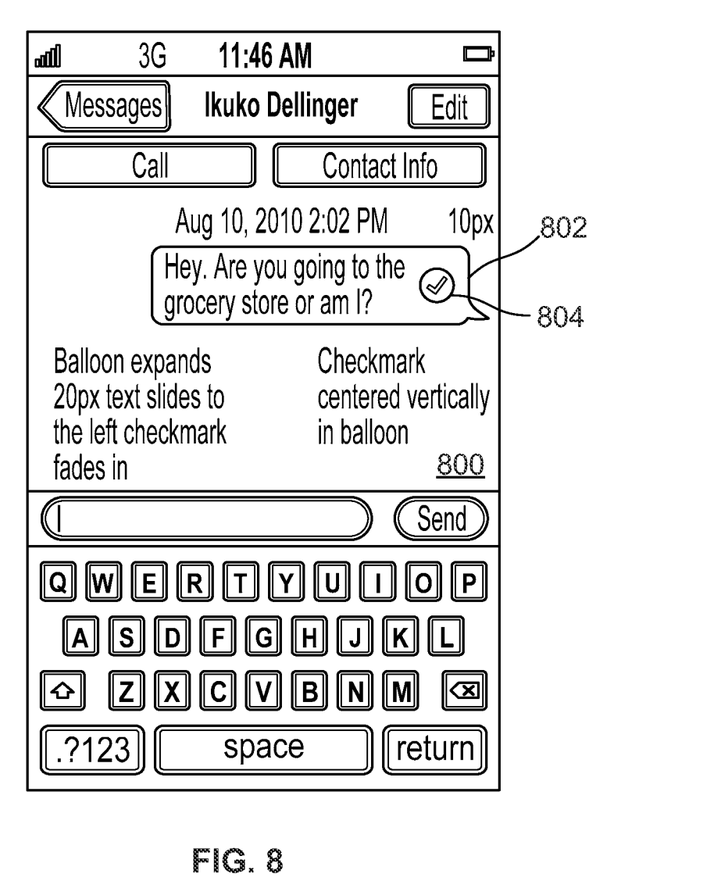
FIG. 8 is a flow diagram of an exemplary GUI for electronic messaging with delivery/read receipts using graphical confirmations for delivery/read receipts.

FIG. 8 is a flow diagram of an exemplary GUI for electronic messaging with delivery/read receipts using graphical confirmations for delivery/read receipts. In some implementations, a text message balloon 802 of GUI 800 can include graphical confirmation 804. In the example shown, a check is used as the graphical confirmation of a delivery/read receipt. Other graphical representations can also be used. The graphical confirmation can be included in text message balloon, as shown in FIG. 8.

Exemplary Process

Figure 9:
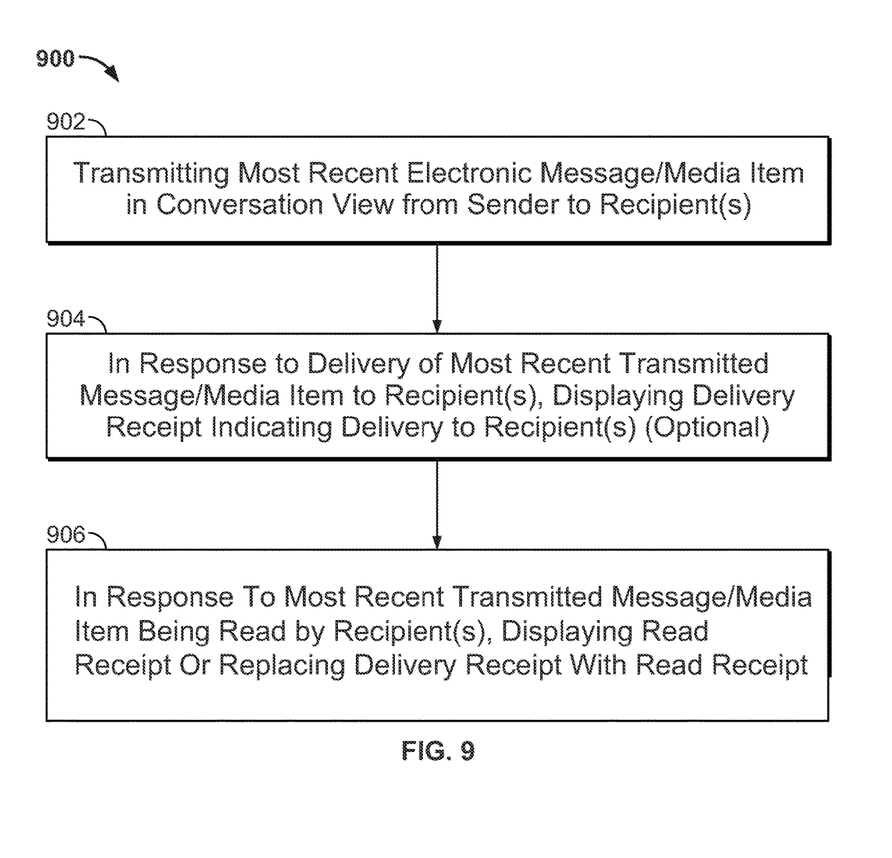
FIG. 9 is a flow diagram of exemplary process electronic messaging with delivery/read receipts.

FIG. 9 is a flow diagram of exemplary process 900 electronic messaging with delivery/read receipts. Process 900 can be implemented using device architecture 1000 operating in environment 900, as described in reference to FIGS. 10 and 11.

Process 900 can begin when a sending device sends an electronic message or media item to one or more recipients of an electronic messaging session (902). The sending device can generate a GUI for display that includes a conversation view format for the electronic messaging session. In response to delivery of the transmitted message or media item to one or more recipient(s) in the session a delivery receipt is displayed in the conversation view displayed on the sending device (904). In some implementations, presenting a delivery receipt before a read receipt can be optional. In some implementations, the delivery receipt can be displayed below the transmitted message in the conversation view. In response to the transmitted message or media item being read by one or more recipients, a read receipt is displayed below the transmitted message or, if a delivery receipt is displayed, the delivery receipt is replaced or morphs into a read receipt only for the most recent message in the conversation view (906).

Exemplary Operating Environment

Figure 10:
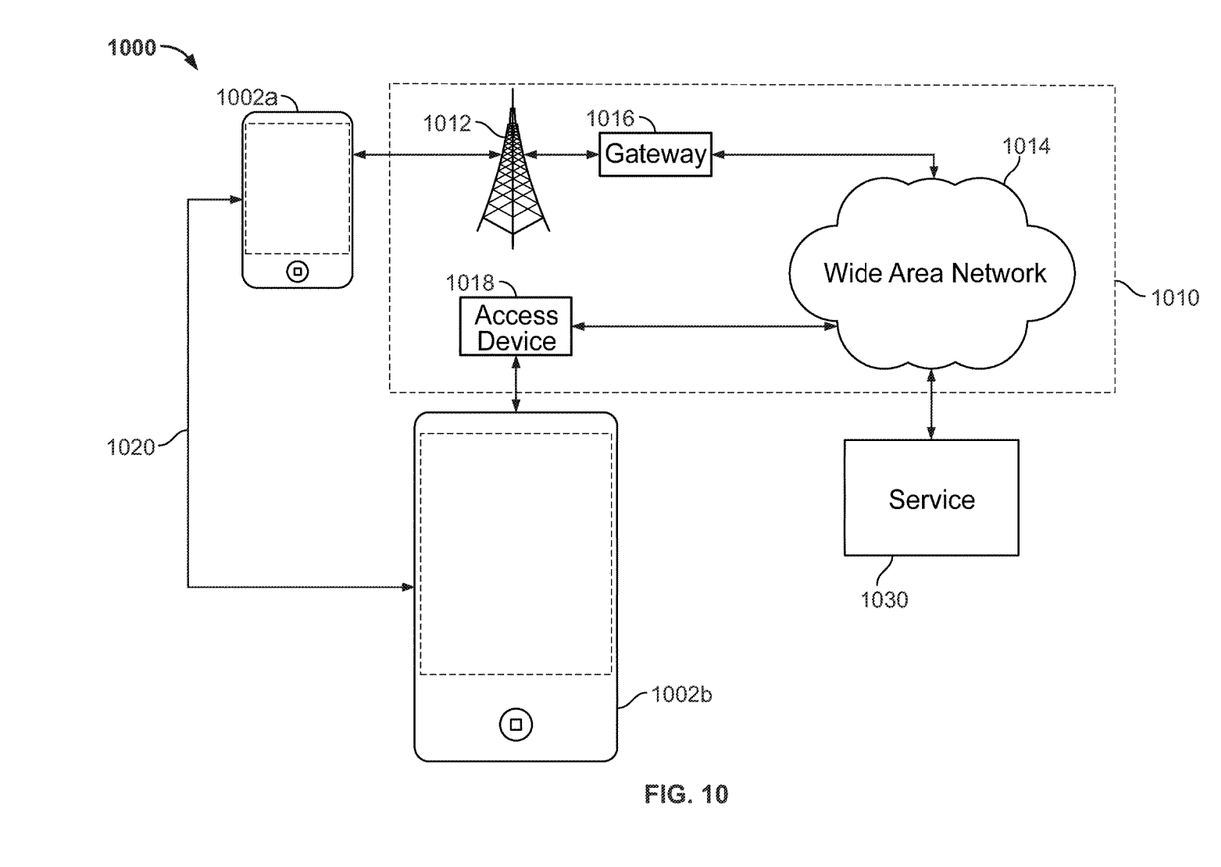
FIG. 10 is a block diagram of an exemplary operating environment capable of implementing an electronic messaging service with delivery/read receipts.

FIG. 10 is a block diagram of an exemplary operating environment capable of implementing electronic messaging with delivered/read receipts. In some implementations, devices 1002a and 1002b can communicate over one or more wired or wireless networks 1010. For example, wireless network 1012 (e.g., a cellular network) can communicate with a wide area network (WAN) 1014 (e.g., the Internet) by use of gateway 1016. Likewise, access device 1018 (e.g., IEEE 802.11g wireless access device) can provide communication access to WAN 1014. Devices 1002a, 1002b can be any device capable of displaying GUIs of the disclosed content authoring application, including but not limited to portable computers, smart phones and electronic tablets. In some implementations, the devices 1002a, 1002b do not have to be portable but can be a desktop computer, television system, kiosk system or the like.

In some implementations, both voice and data communications can be established over wireless network 1012 and access device 1018. For example, device 1002a can place and receive phone calls (e.g., using voice over Internet Protocol (VoIP) protocols), send and receive e-mail messages (e.g., using SMPTP or Post Office Protocol 3 (POP3)), and retrieve electronic documents and/or streams, such as web pages, photographs, and videos, over wireless network 1012, gateway 1016, and WAN 1014 (e.g., using Transmission Control Protocol/Internet Protocol (TCP/IP) or User Datagram Protocol (UDP)). Likewise, in some implementations, device 1002b can place and receive phone calls, send and receive e-mail messages, and retrieve electronic documents over access device 1018 and WAN 1014. In some implementations, device 1002a or 1002b can be physically connected to access device 1018 using one or more cables and access device 1018 can be a personal computer. In this configuration, device 1002a or 1002b can be referred to as a "tethered" device.

Devices 1002a and 1002b can also establish communications by other means. For example, wireless device 1002a can communicate with other wireless devices (e.g., other devices 1002a or 1002b, cell phones) over the wireless network 1012. Likewise, devices 1002a and 1002b can establish peer-to-peer communications 1020 (e.g., a personal area network) by use of one or more communication subsystems, such as the Bluetooth™ communication devices. Other communication protocols and topologies can also be implemented.

Devices 1002a or 1002b can communicate with service 1030 over the one or more wired and/or wireless networks 1010. For example, service 1030 can be an electronic messaging service that manages delivered/read receipts as described in reference to FIGS. 1-8.

Device 1002a or 1002b can also access other data and content over one or more wired and/or wireless networks 1010. For example, content publishers, such as news sites, Really Simple Syndication (RSS) feeds, Web sites and developer networks can be accessed by device 1002a or 1002b. Such access can be provided by invocation of a web browsing function or application (e.g., a browser) running on the device 1002a or 1002b.

Devices 1002a and 1002b can exchange files over one or more wireless or wired networks 1010 either directly or through service 1030.

Exemplary Device Architecture

Figure 11:
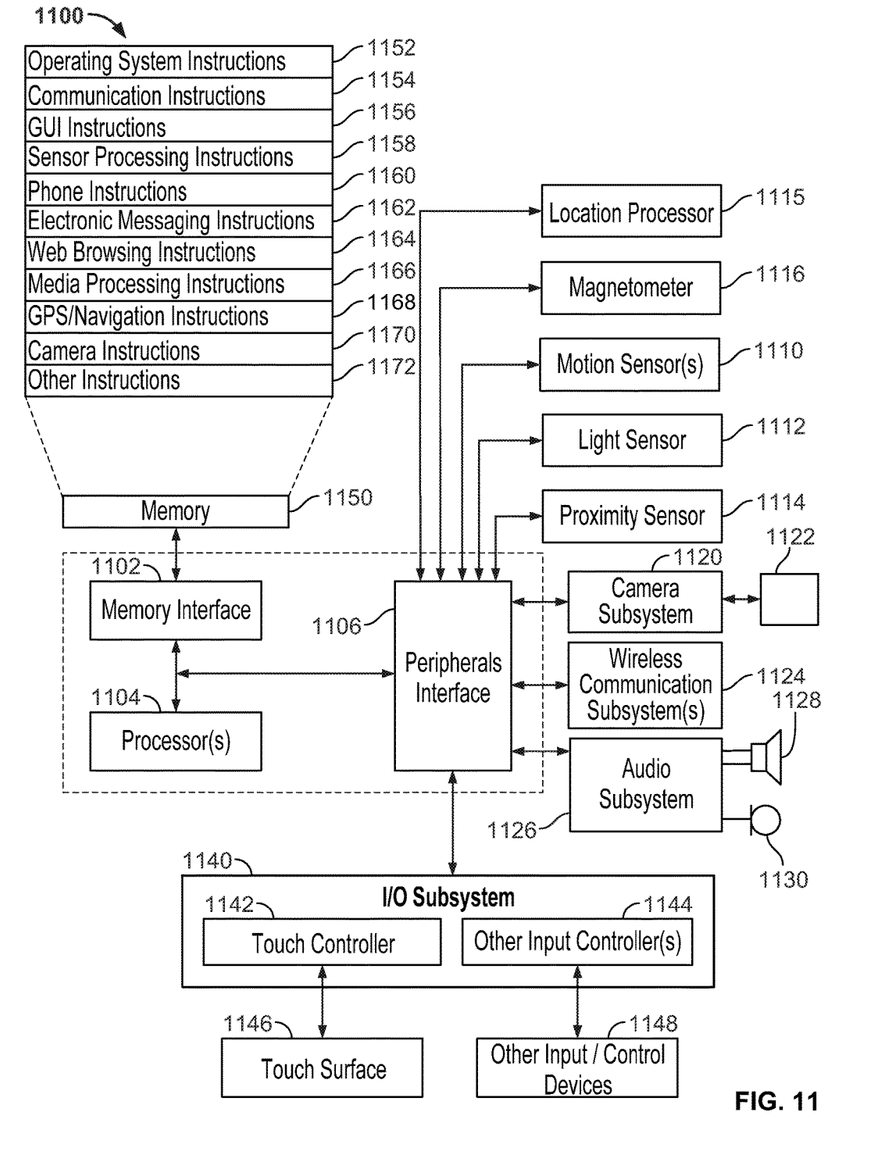
FIG. 11 is a block diagram of an exemplary architecture of a device capable of implementing electronic messaging with delivery/read receipts.

FIG. 11 is a block diagram of an exemplary architecture for a device capable of running a network-enabled content authoring application. Architecture 1100 can be implemented in any device for generating the features described in reference to FIGS. 1-8, including but not limited to portable or desktop computers, smart phones and electronic tablets, television systems, game consoles, kiosks and the like. Architecture 1100 can include memory interface 1102, data processor(s), image processor(s) or central processing unit(s) 1104, and peripherals interface 1106. Memory interface 1102, processor(s) 1104 or peripherals interface 1106 can be separate components or can be integrated in one or more integrated circuits. The various components can be coupled by one or more communication buses or signal lines.

Sensors, devices, and subsystems can be coupled to peripherals interface 1106 to facilitate multiple functionalities. For example, motion sensor 1110, light sensor 1112, and proximity sensor 1114 can be coupled to peripherals interface 1106 to facilitate orientation, lighting, and proximity functions of the device. For example, in some implementations, light sensor 1112 can be utilized to facilitate adjusting the brightness of touch surface 1146. In some implementations, motion sensor 1110 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 1106, such as a temperature sensor, a biometric sensor, or other sensing device, to facilitate related functionalities.

Location processor 1115 (e.g., GPS receiver) can be connected to peripherals interface 1106 to provide geo-positioning. Electronic magnetometer 1116 (e.g., an integrated circuit chip) can also be connected to peripherals interface 1106 to provide data that can be used to determine the direction of magnetic North. Thus, electronic magnetometer 1116 can be used as an electronic compass.

Camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 1124. Communication subsystem(s) 1124 can include one or more wireless communication subsystems. Wireless communication subsystems 1124 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 1124 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 1124 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1126 can be coupled to a speaker 1128 and one or more microphones 1130 to facilitate voice-enabled functions, such as voice recognition, voice replication, digital recording, and telephony functions.

I/O subsystem 1140 can include touch controller 1142 and/or other input controller(s) 1144. Touch controller 1142 can be coupled to a touch surface 1146. Touch surface 1146 and touch controller 1142 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 1146. In one implementation, touch surface 1146 can display virtual or soft buttons and a virtual keyboard, which can be used as an input/output device by the user.

Other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of speaker 1128 and/or microphone 1130.

In some implementations, device 1100 can present recorded audio and/or video files, such as MP3, AAC, and MPEG files. In some implementations, device 1100 can include the functionality of an MP3 player and may include a pin connector for tethering to other devices. Other input/output and control devices can be used.

Memory interface 1102 can be coupled to memory 1150. Memory 1150 can include high-speed random access memory or non-volatile memory, such as one or more magnetic disk storage devices, one or more optical storage devices, or flash memory (e.g., NAND, NOR). Memory 1150 can store operating system 1152, such as Darwin, RTXC, LINUX, UNIX, OS X, WINDOWS, or an embedded operating system such as VxWorks. Operating system 1152 may include instructions for handling basic system services and for performing hardware dependent tasks. In some implementations, operating system 1152 can include a kernel (e.g., UNIX kernel).

Memory 1150 may also store communication instructions 1154 to facilitate communicating with one or more additional devices, one or more computers or servers. Communication instructions 1154 can also be used to select an operational mode or communication medium for use by the device, based on a geographic location (obtained by the GPS/Navigation instructions 1168) of the device. Memory 1150 may include graphical user interface instructions 1156 to facilitate graphic user interface processing, such as generating the GUIs shown in FIGS. 1-9; sensor processing instructions 1158 to facilitate sensor-related processing and functions; phone instructions 1160 to facilitate phone-related processes and functions; electronic messaging instructions 1162 to facilitate electronic-messaging related processes and functions as described in reference to FIGS. 1-9; web browsing instructions 1164 to facilitate web browsing-related processes and functions; media processing instructions 1166 to facilitate media processing-related processes and functions; GPS/Navigation instructions 1168 to facilitate GPS and navigation-related processes; camera instructions 1170 to facilitate camera-related processes and functions; and other instructions 1172, such as instructions for other applications. The memory 1150 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 1150 can include additional instructions or fewer instructions. Furthermore, various functions of the mobile device may be implemented in hardware and/or in software, including in one or more signal processing and/or application specific integrated circuits.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, many of the examples presented in this document were presented in the context of an ebook. The systems and techniques presented herein are also applicable to other electronic text such as electronic newspaper, electronic magazine, electronic documents etc. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
  at a sender device with a display:
    displaying, on the display, a message conversation that includes a plurality of messages between a sender and a recipient associated with one or more recipient devices, including concurrently displaying:
      a first message sent from the sender device that has been delivered to one or more recipient devices and has been read;

a second message sent from the sender device that has been delivered to one or more recipient devices but has not been read;

a third message sent from a respective one of the one or more recipient devices to the sender device; and displaying a delivery receipt for the second message, the delivery receipt indicating that the second message has been delivered to one or more of the recipient devices, wherein the delivery receipt is displayed at a first respective location in the message conversation; and in response to determining that the second message has been read on at least one of the recipient devices, replacing the delivery receipt with a read receipt for the second message in the message conversation, wherein replacing display of the delivery receipt with the read receipt for the second message includes:

ceasing to display the delivery receipt in the message conversation; and displaying the read receipt for the second message at the first respective location in the message conversation at which the delivery receipt was previously displayed without displaying a read receipt for the first message and a read receipt for the third message.

2. The method of claim 1, wherein replacing the delivery receipt in the message conversation comprises morphing the delivery receipt into the read receipt.

3. The method of claim 1, wherein the delivery receipt or the read receipt includes a graphical confirmation.

4. The method of claim 1, further comprising:

in response to determining that the first message has been read on at least one of the recipient devices, displaying the read receipt for the first message at a second respective location in the message conversation;

wherein displaying the read receipt for the second message at the first respective location without displaying the read receipts for the first message and the third message comprises ceasing to display the read receipt for the first message at the second respective location in the message conversation.

5. The method of claim 4, wherein the second respective location is below the first message and wherein the first respective location is below the second message.

6. The method of claim 4, wherein a separation between the first message and the second or third messages in the message conversation results from displaying the read receipt for the first message; and wherein replacing display of the delivery receipt with the read receipt for the second message further includes moving the second or third messages in the message conversation to reduce or eliminate the separation between the first message and the second or third messages.

7. The method of claim 1, wherein replacing display of the delivery receipt with the read receipt for the second message further includes replacing a displayed delivery time of the delivery receipt with a displayed read time of the read receipt.

8. A non-transitory computer-readable storage medium configured to store instructions, which, when executed by a sender device with a display and one or more processors, causes the one or more processors to perform operations, comprising:

displaying, on the display, a message conversation that includes a plurality of messages between a sender and a recipient associated with one or more recipient devices, including concurrently displaying:

a first message sent from the sender device that has been delivered to one or more recipient devices and has been read;

a second message sent from the sender device that has been delivered to one or more recipient devices but has not been read;

a third message sent from a respective one of the one or more recipient devices to the sender device; and displaying a delivery receipt for the second message, the delivery receipt indicating that the second message has been delivered to one or more of the recipient devices, wherein the delivery receipt is displayed at a first respective location in the message conversation; and in response to determining that the second message has been read on at least one of the recipient devices, replacing the delivery receipt with a read receipt for the second message in the message conversation, wherein replacing display of the delivery receipt with the read receipt for the second message includes:

ceasing to display the delivery receipt in the message conversation; and displaying the read receipt for the second message at the first respective location in the message conversation at which the delivery receipt was previously displayed without displaying a read receipt for the first message and a read receipt for the third message.

9. The computer-readable medium of claim 8, wherein replacing the delivery receipt in the message conversation comprises morphing the delivery receipt into the read receipt.

10. The computer-readable medium of claim 8, wherein the delivery receipt or the read receipt includes a graphical confirmation.

11. The non-transitory computer-readable storage medium of claim 8, the operations further comprising:

in response to determining that the first message has been read on at least one of the recipient devices, displaying the read receipt for the first message at a second respective location in the message conversation;

wherein displaying the read receipt for the second message at the first respective location without displaying the read receipts for the first message and the third message comprises ceasing to display the read receipt for the first message at the second respective location in the message conversation.

12. The non-transitory computer-readable storage medium of claim 11, wherein the second respective location is below the first message and wherein the first respective location is below the second message.

13. The non-transitory computer-readable storage medium of claim 11, wherein a separation between the first message and the second or third messages in the message conversation results from displaying the read receipt for the first message; and wherein replacing display of the delivery receipt with the read receipt for the second message further includes moving the second or third messages in the message conversation to reduce or eliminate the separation between the first message and the second or third messages.

14. The non-transitory computer-readable storage medium of claim 8, wherein replacing display of the delivery receipt with the read receipt for the second message further includes replacing a displayed delivery time of the delivery receipt with a displayed read time of the read receipt.

15. A sender device comprising:
   a display
   one or more processors;
   memory coupled to the one or more processors and configured to store instructions which, when executed by the one or more processors, causes the one or more processors to perform operations comprising:
      displaying, on the display, a message conversation that includes a plurality of messages between a sender and a recipient associated with one or more recipient devices, including concurrently displaying:
         a first message sent from the sender device that has been delivered to one or more recipient devices and has been read;
         a second message sent from the sender device that has been delivered to one or more recipient devices but has not been read;
         a third message sent from a respective one of the one or more recipient devices to the sender device; and
      displaying a delivery receipt for the second message, the delivery receipt indicating that the second message has been delivered to one or more of the recipient devices, wherein the delivery receipt is displayed at a first respective location in the message conversation; and
   in response to determining that the second message has been read on at least one of the recipient devices, replacing the delivery receipt with a read receipt for the second message in the message conversation, wherein replacing display of the delivery receipt with the read receipt for the second message includes:
      ceasing to display the delivery receipt in the message conversation; and
      displaying the read receipt for the second message at the first respective location in the message conversation at which the delivery receipt was previously displayed without displaying a read receipt for the first message and a read receipt for the third message.

16. The sender device of claim 15, where replacing the delivery receipt in the message conversation comprises morphing the delivery receipt into the read receipt.

17. The sender device of claim 15, wherein the delivery receipt or the read receipt includes a graphical confirmation.

18. The sender device of claim 15, the operations further comprising:
   in response to determining that the first message has been read on at least one of the recipient devices, displaying the read receipt for the first message at a second respective location in the message conversation;
   wherein displaying the read receipt for the second message at the first respective location without displaying the read receipts for the first message and the third message comprises ceasing to display the read receipt for the first message at the second respective location in the message conversation.

19. The sender device of claim 18, wherein the second respective location is below the first message and wherein the first respective location is below the second message.

20. The sender device of claim 18, wherein a separation between the first message and the second or third messages in the message conversation results from displaying the read receipt for the first message; and
   wherein replacing display of the delivery receipt with the read receipt for the second message further includes moving the second or third messages in the message conversation to reduce or eliminate the separation between the first message and the second or third messages.

21. The sender device of claim 15, wherein replacing display of the delivery receipt with the read receipt for the second message further includes replacing a displayed delivery time of the delivery receipt with a displayed read time of the read receipt.

* * * * *